United States Patent [19]
Coral et al.

[11] Patent Number: 6,058,698
[45] Date of Patent: May 9, 2000

[54] DEVICE FOR PURIFYING THE EXHAUST GAS OF AN INTERNAL COMBUSTION ENGINE

[75] Inventors: Nevio Coral; Luciano Coral; Claudio Coral, all of Leini', Italy

[73] Assignee: Coral S.P.A., Leini, Italy

[21] Appl. No.: 09/051,448

[22] PCT Filed: Oct. 11, 1996

[86] PCT No.: PCT/IT96/00190

§ 371 Date: Jun. 4, 1998

§ 102(e) Date: Jun. 4, 1998

[87] PCT Pub. No.: WO97/13963

PCT Pub. Date: Apr. 17, 1997

[30] Foreign Application Priority Data

Oct. 13, 1995 [IT] Italy .................................. TO95A0827

[51] Int. Cl.[7] ................................................ F01N 3/00
[52] U.S. Cl. .......................... 60/275; 60/311; 422/186.04
[58] Field of Search ................ 60/275, 311; 422/186.04, 422/186.06, 186.03, 186.18

[56] References Cited

U.S. PATENT DOCUMENTS

| | | | |
|---|---|---|---|
| 3,818,678 | 6/1974 | Gothard | 55/12 |
| 3,846,637 | 11/1974 | Gettinger | 60/275 |
| 3,979,193 | 9/1976 | Sikich . | |
| 3,983,021 | 9/1976 | Henis . | |
| 4,362,016 | 12/1982 | Papadopulos . | |
| 4,587,807 | 5/1986 | Suzuki . | |
| 4,945,721 | 8/1990 | Cornwell et al. | 60/274 |
| 5,822,980 | 10/1998 | Chen | 60/274 |

FOREIGN PATENT DOCUMENTS

| | | |
|---|---|---|
| 5-332128 | 12/1993 | Japan . |
| 1221392 | 3/1986 | Russian Federation ............... 60/275 |
| WO 91 02581 | 3/1991 | WIPO . |

*Primary Examiner*—Thomas Denion
*Assistant Examiner*—Binh Tran
*Attorney, Agent, or Firm*—Darby & Darby

[57] ABSTRACT

The device presents an ionization cell (14, 114) housed inside a casing (13, 113) fitted inside the exhaust conduit (6, 106) of the engine (5, 105); and the cell (14, 114) presents at least one circularly symmetrical cathode (23, 64) supplied by an electronic circuit to generate a discharge of negative ions at such a speed as to break the peripheral electron bonds of the toxic or pollutant component molecules of the exhaust gas. In an embodiment for spark-ignition combustion engines (5), the casing (13) presents two coaxial fittings (21, 22), each surrounded by a metal sponge filter (33) for storing the heat of the gas. In a further embodiment for diesel engines (105), the casing (113) presents an inverting chamber (47) for inverting the gas flow and located upstream from the ionization cell (114); and the gas is heated in the inverting chamber (47) by resistors (61) supplied by the battery. In a variation of the device, a further fitting is provided for feeding part of the purified, ionized exhaust gas back to the intake conduit of the engine to improve engine efficiency during cold-starting and when accelerating sharply.

29 Claims, 6 Drawing Sheets

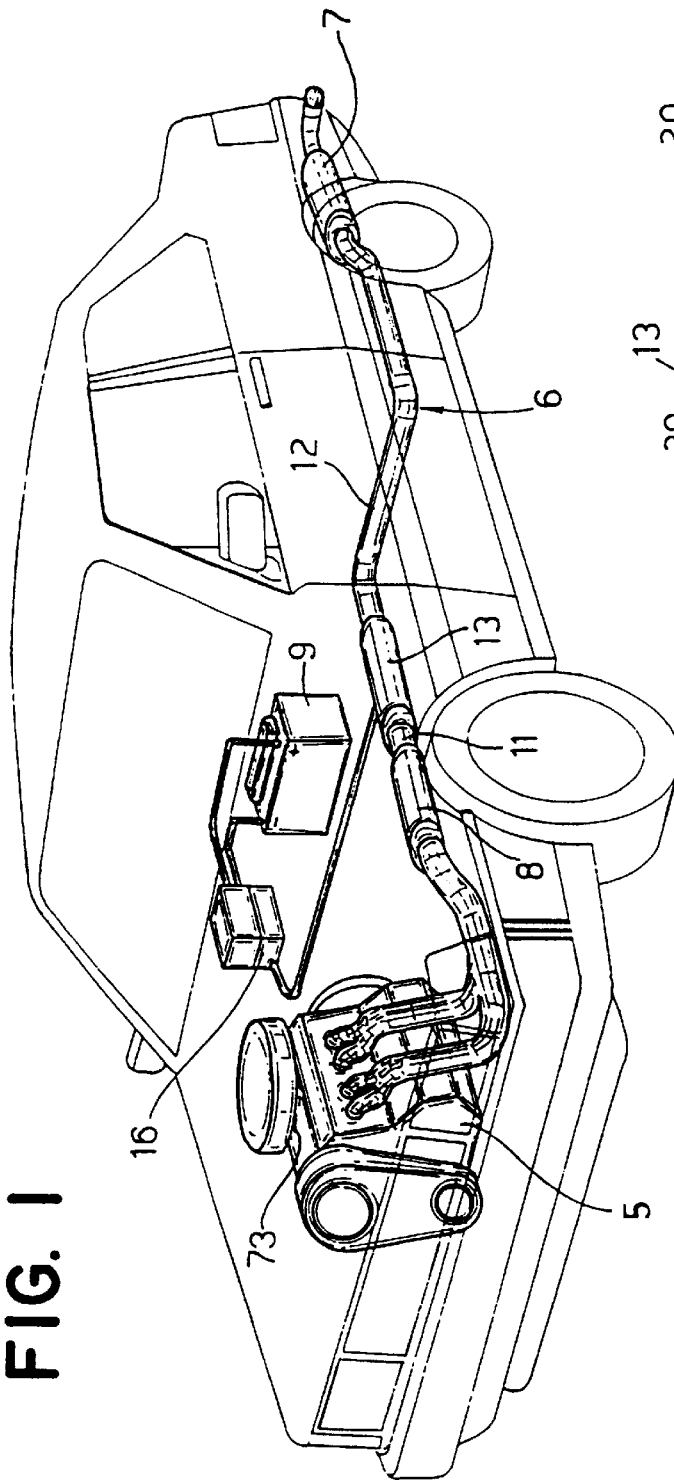
FIG. I
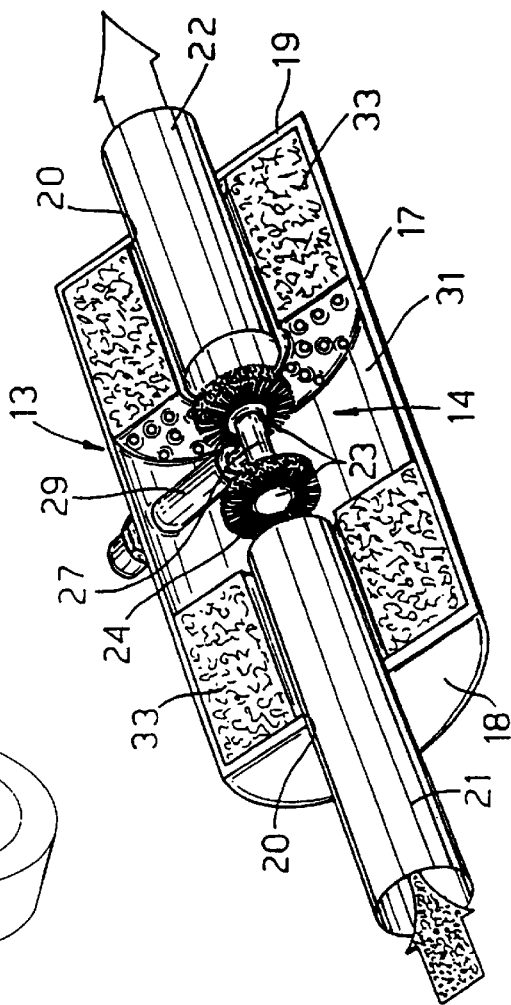
FIG. 2

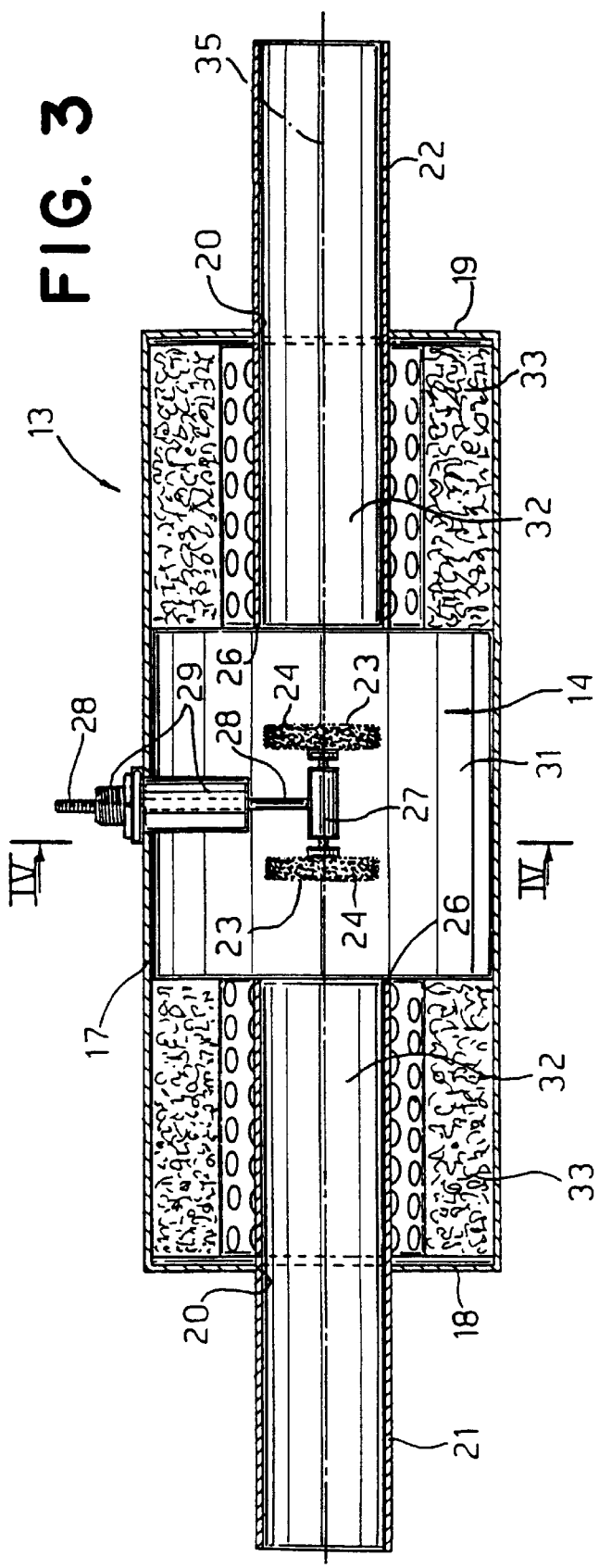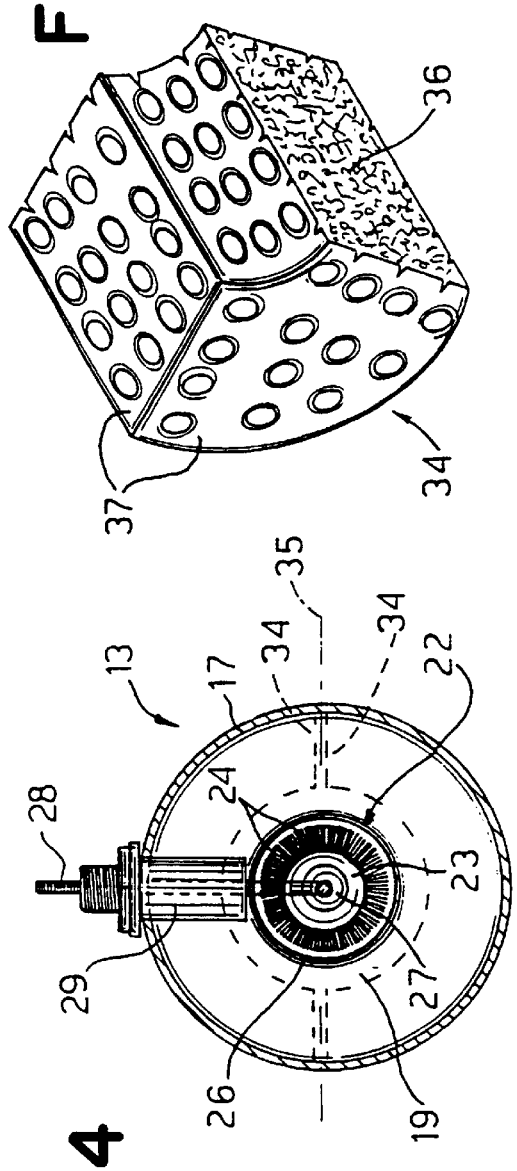

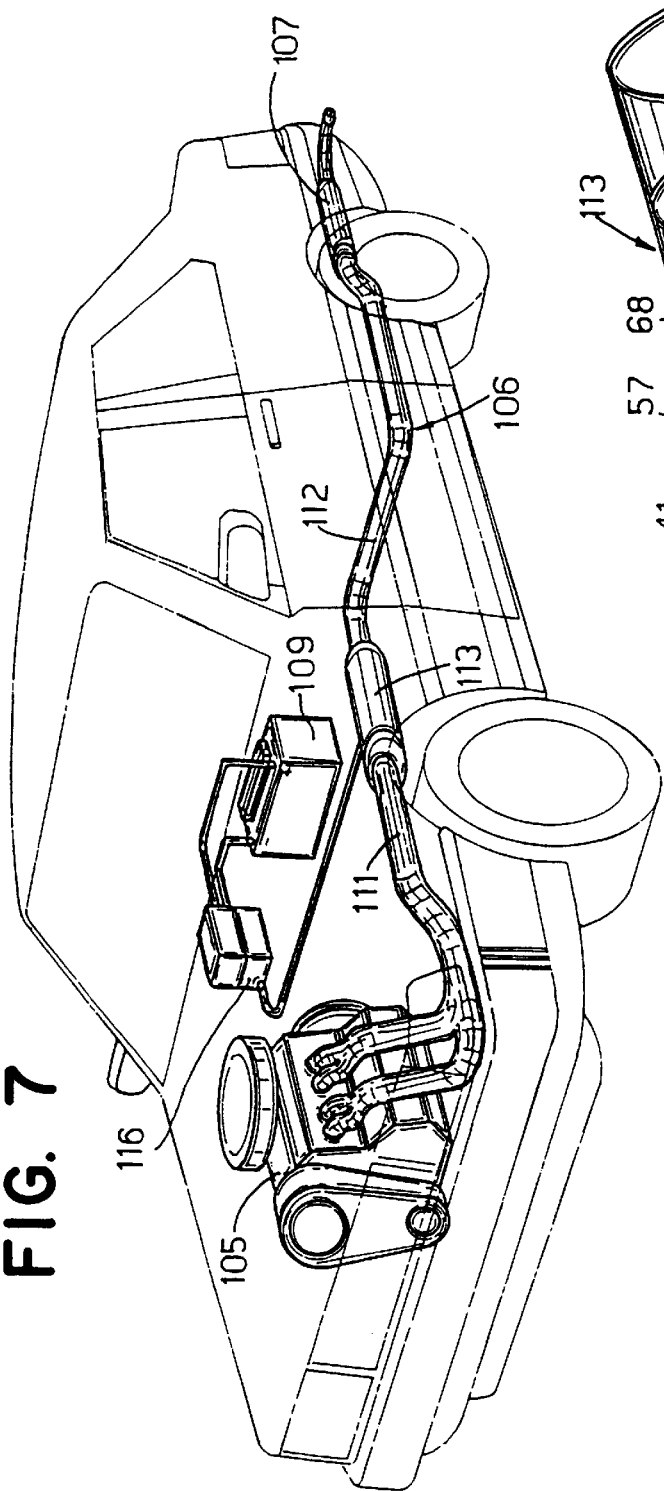
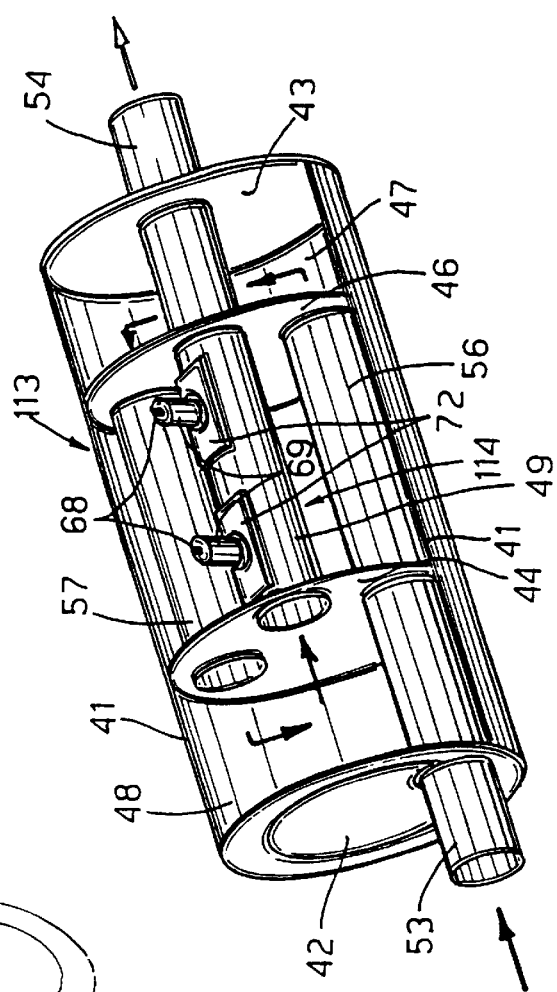
FIG. 7
FIG. 8

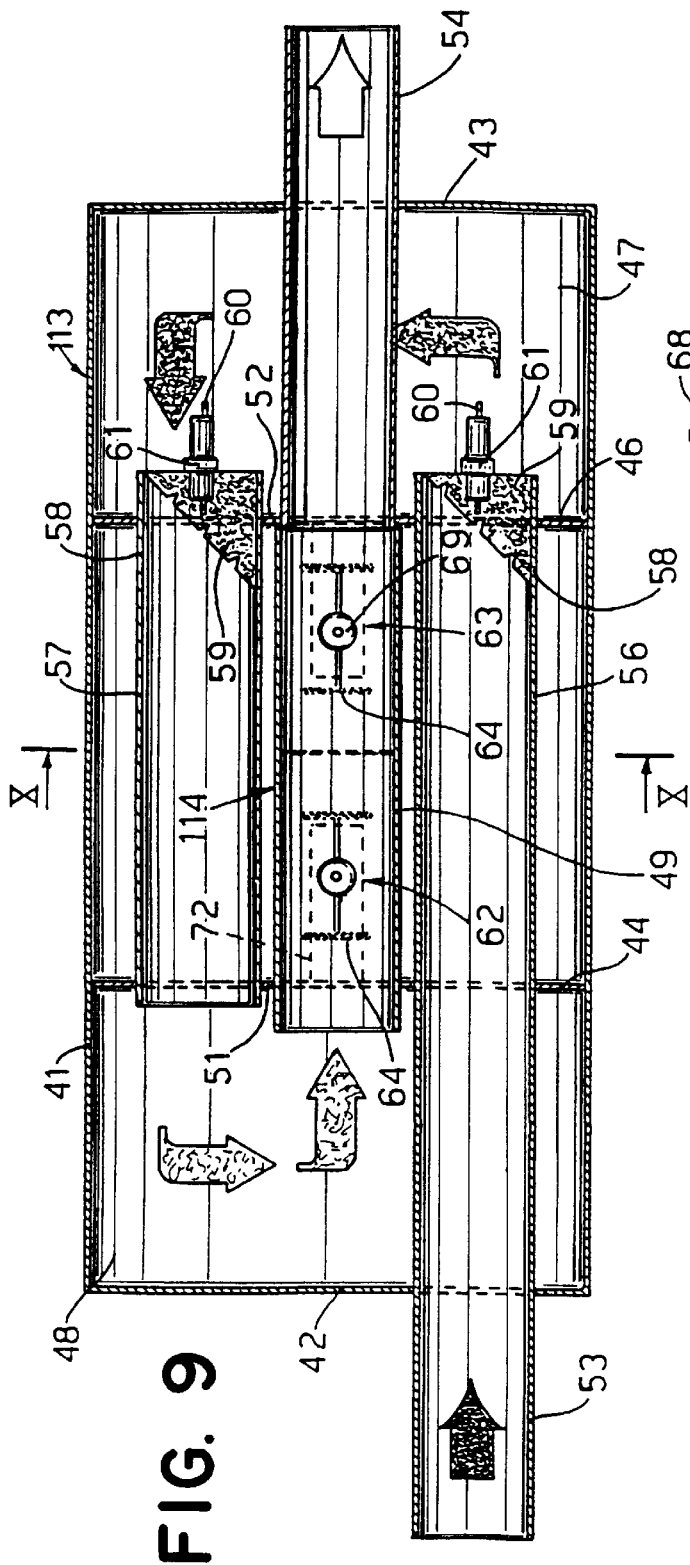
FIG. 9
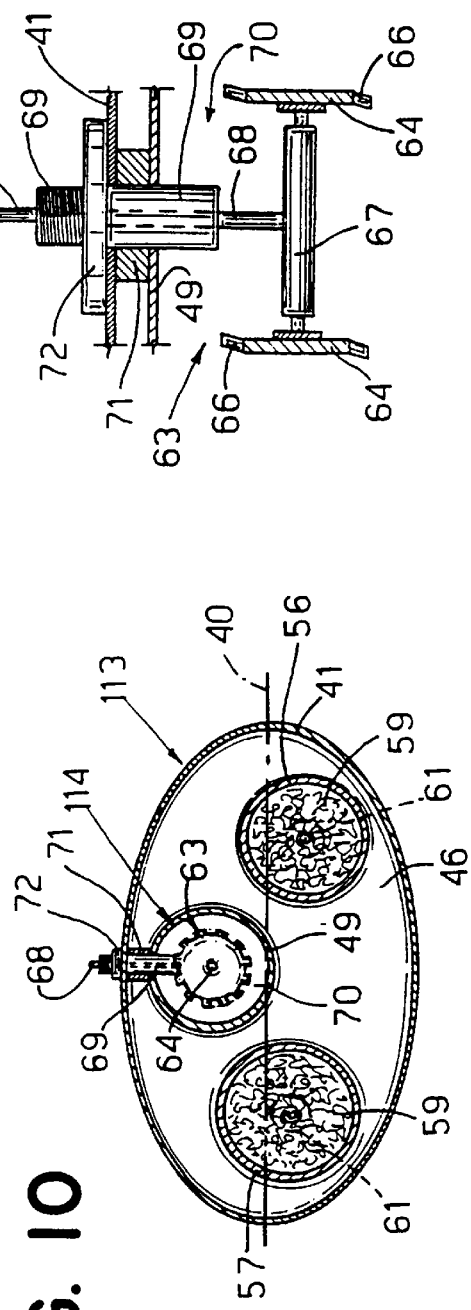
FIG. 11
FIG. 10

DEVICE FOR PURIFYING THE EXHAUST GAS OF AN INTERNAL COMBUSTION ENGINE

TECHNICAL FIELD

The present invention relates to a device for purifying the exhaust gas of an internal combustion engine.

BACKGROUND ART

On internal combustion engines, particularly car engines, the exhaust gas produced by combustion of the fuel in the engine contains pollutant or toxic gases and vapours due to imperfect combustion of the hydrocarbons and to the additives used in the fuel to improve the heat cycle, and is fed into and discharged from an exhaust pipe normally fitted at the end with a silencer for absorbing the peak sound waves and deadening the overall noise produced by the exhaust gas.

As is known, car engine fuels—petrol, L.P.G. or methane in spark-ignition combustion engines, and gas oil in diesel engines—comprise hydrocarbons of the general chemical formula CnHm, i.e. having more or less large carbon and hydrogen molecules of various atom arrangements. The atmospheric air drawn into the engine for combustion is a mixture of nitrogen, oxygen and water vapour—the latter varying according to the degree of humidity—and also contains other gases and vapours depending, obviously, on the degree of pollution of the atmosphere in which the engine is operated.

If the oxidation process were perfect, the chemical reaction would be:

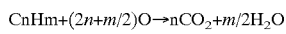

$$CnHm+(2n+m/2)O \rightarrow nCO_2+m/2H_2O$$

and only carbon dioxide and water vapour molecules would be produced. In actual practice, however, internal combustion engines also emit unburnt hydrocarbon vapours, other noxious gases such as nitric oxide, and toxic gases such as carbon monoxide.

The composition and percentage of toxic or noxious exhaust gas components vary considerably from one engine to another, and the percentage is particularly high in traffic jams or particular atmospheric conditions in which the gas settles and cannot be dispersed readily into the atmosphere. In certain urban areas, high-molecular-weight gas, such as carbon dioxide and hydrocarbon vapours, forms a layer which concentrates infrared rays and results in the so-called greenhouse effect responsible for sudden changes in weather.

Moreover, to improve compression in the cylinders and prevent spontaneous ignition of the mixture, spark-ignition combustion engines employ petrol containing antiknock additives, in particular tetraethyllead in leaded, so-called red, petrol, which is notoriously toxic. To eliminate the noxious effect of tetraethyllead, unleaded or so-called green petrol has recently been developed, in which the antiknock additive comprises an aromatic hydrocarbon MTBE (methyl-ter-butyl-ether) or benzene. Like most unburnt hydrocarbons and polymers, however, unleaded petrol is cancerogenic and should therefore only be used in engines equipped with a catalyzed muffler featuring a lambda probe and in which the unburnt hydrocarbons from the cylinders are burnt.

In diesel engines, in which fuel combustion occurs spontaneously by injecting the fuel into the combustion chamber at the compression stroke, combustion is frequently incomplete for various reasons—fuel supply, injector settings, engine speed and load, warm-up operation of the engine—so that the exhaust gas is more or less dark in colour, due to waste and/or various unburnt hydrocarbons forming the so-called "particulate" of the gas.

On modern spark-ignition combustion engines equipped with catalyzed mufflers, and diesel engines equipped with electronic-control injectors, toxic emissions have been greatly reduced, but absolutely no reduction has been achieved in the emission of pollutant substances, such as $CO_2$.

From document U.S. Pat. No. 3,983,021, it is known a nitrogen oxide decomposition device for the exhaust gas of internal combustion engines, wherein the gas is conveyed to a dielectric tubular pipe having on its outer surface a conductive covering and containing an inner electrode in form of a cylindrical bar. The electrode and the covering are connected to a high voltage generator to provide a plasma discharge into the pipe, in which high surface area packing material is disposed. The nitrogen oxide are decomposed by the the ionizing action of the discharge and by the absorption action of the material.

From document U.S. Pat. No. 3,979,193, it is known a corona discharge apparatus for removing pollution of gas of internal combustion engines into a corona-producing chamber. The longitudinal wall of this chamber is formed of an electrically conductive material and acts as a reactor for a corona emission produced by a coaxial coupling rod, which is provided with a set of discs, each having serrated peripheral edge of small surface area. The gas to be introduced into the chamber are mixed with air to provide an amount of oxygen within the exhaust for converting carbon monoxide to carbon dioxide.

DISCLOSURE OF THE INVENTION

It is an object of the present invention to provide a highly straightforward, reliable device for purifying the exhaust gas of internal combustion engines, and which may be applied to any type of engine for reducing the pollution and/or toxic components in the exhaust gas.

According to the present invention, there is provided a device for purifying the exhaust gas of an internal combustion engine comprising a voltage source and an exhaust conduit for collecting and externally discharging said gas; said exhaust conduit being connected with a casing housing an ionization cell for generating a discharge of electrons such as to form an ionization portion along the path of said gas; an electronic circuit supplied by said source to produce said discharge in such a manner that said electrons assume such a speed as to break the peripheral electron bonds of the molecules of said gas, thus liberating non-pollutant ionic molecules; said cell housing circularly symmetric electrode means; characterized in that said electrode means include at least one pair of coaxial circularly symmetric cathodes, each one having a number of metall wires provided on the peripheral edge of each said cathode as to form a circular brush, said wires hurling said electrons substantially radially toward an anode coaxially located around said cathodes, the cathodes of said pair being connected to each other by a bar of predetermined length, said bar being connected by insulating means to an electric terminal fitted to said casing.

To improve the efficiency of the engine during start and/or when accelerating, the casing of the purifying device presents a fitting connected to an intake conduit of the engine to enable at least part of the purified, ionized gas to recirculate to the intake conduit.

BRIEF DESCRIPTION OF THE DRAWINGS

Two preferred, non limiting embodiments of the present invention will be described by way of example with reference to the accompanying drawings, in which:

FIG. 1 shows a schematic view in perspective of an internal combustion engine featuring a first embodiment of a purifying device in accordance with the present invention;

FIG. 2 shows a larger-scale view in perspective, with parts removed for clarity, of the FIG. 1 device;

FIG. 3 shows a vertical diametrical section of the FIG. 2 device;

FIG. 4 shows a section along line IV—IV in FIG. 3;

FIG. 5 shows a larger-scale detail of FIG. 2;

FIG. 7 shows a schematic view in perspective of an internal combustion engine featuring a further embodiment of a purifying device in accordance with the present invention;

FIG. 8 shows a larger-scale view in perspective, with parts removed for clarity, of the FIG. 7 device;

FIG. 9 shows a horizontal diametrical section of the FIG. 8 device;

FIG. 10 shows a section along line X—X in FIG. 9;

FIG. 11 shows a larger-scale lateral section of a detail of FIG. 10;

BEST MODE FOR CARRYING OUT THE INVENTION

Figure 6:
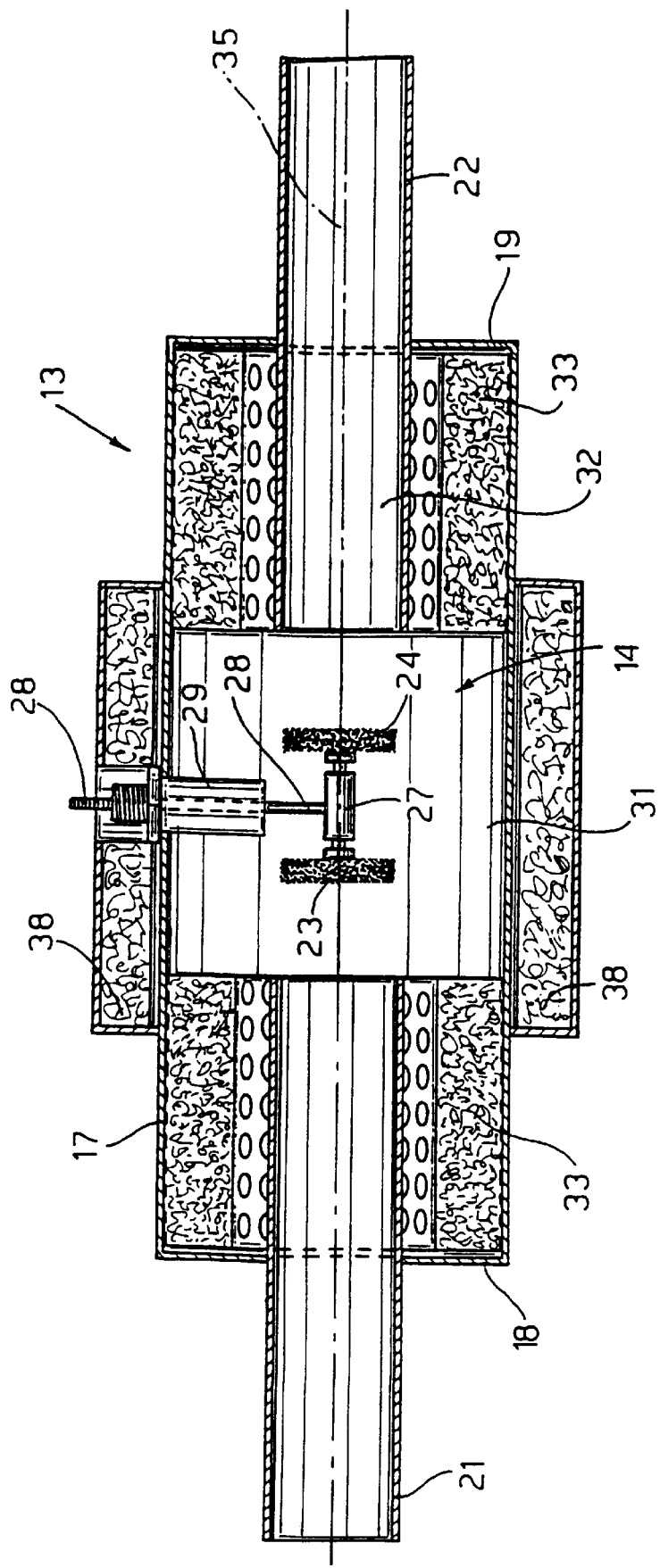
FIG. 6 shows a section, similar to that in FIG. 3, of a variation of the device.

The purifying devices according to the present invention and as described below may be located at any point along the exhaust pipe as required for obtaining the best results, and the shape and structural characteristics of the device may also vary as required.

Number 5 in FIG. 1 indicates a car spark-ignition combustion engine run on unleaded petrol and presenting an exhaust conduit 6; the end portion of conduit 6 houses a silencer 7; the portion adjacent to the branch connected to the cylinders houses a catalyzed muffler 8; and engine 5 presents a voltage source comprising an electric battery 9 for starting the engine, igniting the mixture, and powering the lights and indicators of the vehicle.

According to the invention, conduit 6 is divided into two portions 11 and 12, preferably between muffler 8 and silencer 7; a casing 13 housing an ionization cell 14 (FIG. 2) is inserted between portions 11 and 12; and cell 14 is connected electrically to an electronic circuit 16 supplied by battery 9, and which provides for accumulating electrons in cell 14 and producing a discharge of negative ions such as to form a molecule collision-ionization portion along the path of the exhaust gas.

More specifically, casing 13 presents a preferably cylindrical lateral wall 17 closed by two substantially flat transverse walls 18 and 19, each presenting an opening 20; and the openings 20 in walls 18 and 19 are fitted in gastight manner with respective tubular fittings 21 and 22 coaxial with each other and which are connected in known manner to portions 11 and 12 of conduit 6.

Fittings 21 and 22 (FIGS. 3 and 4) extend inside casing 13 to ensure a smooth path for the gas with no sharp variations in section; cell 14 comprises a pair of cathodes 23, each circular and symmetrical about the axis of casing 13; the peripheral edge of each cathode 23 presents a number of elements 24 in the form of metal wires or other pointed elements, so that cathode 23 assumes the appearance of a circular brush; and elements 24 provide for hurling the electrons radially on to an anode comprising an edge or end portion 26 of respective fitting 21, 22.

Cathodes 23 are connected to each other by a coaxial conducting bar 27 of given length, and which is connected to an electric terminal 28 fitted radially to casing 13. More specifically, terminal 28 is housed inside a column 29 made of ceramic insulating material and fitted in gastight manner to the lateral wall 17 of casing 13.

The outer end of terminal 28 is connected to the positive pole of electronic circuit 16 (FIG. 1) and fittings 21 and 22 are grounded. Circuit 16 generates a voltage of 30,000 to 70,000 volts to produce a discharge of negative ions by elements 24 on to the edge of portions 26 of fittings 21 and 22, and therefore on to the inner surface of casing 13, at a speed of about 100,000 km/sec. This speed is such as to collision-break the electron bonds of the complex molecules of toxic or noxious substances and so liberate nonpollutant ionic molecules, as described in the International Patent Application PCT/IT 00130 filed on Jun. 27, 1996, by the present Applicant.

The two edges 26 are separated axially by a given distance from respective cathodes 23, so as to form, at the ionization portion, a gas expansion chamber 31 presenting a smooth lateral wall, and which provides, at the ionization portion, for preventing the formation of counterpressures on the gas in the direction of engine 5.

Each fitting 21, 22 comprises a portion 32 housed inside casing 13, terminating at edge 26, and surrounded by a metal sponge filter 33, which provides for storing heat and so preventing an excessive fall in the temperature of the gas flowing along portions 32. For each portion 32, filter 33 is advantageously divided into two substantially semiannular portions 34 (shown by the dotted lines in FIG. 4) symmetrical in relation to the diametrical plane 35 of casing 13.

Each portion 34 of filter 33 comprises a metal sponge 36 (FIG. 5) made of inoxidizable sintered material and enclosed inside a respective semiannular container 37 presetting perforated stainless sheet steel walls and fitted, e.g. spot welded, to walls 17–19 of the respective portion of casing 13.

In the FIG. 6 variation, expansion chamber 31 is fitted externally with an additional metal sponge filter 38, which also provides for storing the heat of the gas during ionization.

In actual use, the exhaust gas from engine 5 (FIG. 1) flows through catalyzed muffler 8 by which it is catalyzed to minimize the nitrous oxide and practically eliminate the carbon monoxide content; circuit 16 supplies cathodes 23 (FIG. 2) to ionize chamber 31 of cell 14; and metal elements 24 accumulate high-speed electrons and discharge bands of negative ions on to edges 26 of respective fittings 21 and 22.

The exhaust gas flowing along fitting 21 from muffler 8 is intercepted by the discharge of negative ions in chamber 31, which break down the complex molecules of the unburnt hydrocarbons and carbon dioxide to reduce their concentration and increase the ionic oxygen content of the gas, which then flows along fitting 22 to silencer 7 and the outlet of conduit 6.

Exhaust gas tests conducted on car spark-ignition combustion engines with multipoint electronic injection and a catalyzed muffler with a lambda probe gave the results shown below, which are purely indicative and obviously subject to improvement:

1) without the purifying device:
carbon monoxide CO 0.00%
carbon dioxide $CO_2$ 15.00%
unburnt hydrocarbons HC 156 ppm (parts per million)
nitrous oxide NO 14 ppm
oxygen $O_2$ 0.60%
2) with the purifying device:
carbon monoxide CO 0.00%
carbon dioxide $CO_2$ 7.30%
unburnt hydrocarbons HC 80 ppm
nitrous oxide NO 14 ppm
oxygen $O_2$ 10.69%

On engines with a catalyzed muffler, the purifying device in FIGS. 1–6 therefore provides for a drastic reduction in carbon dioxide and unburnt hydrocarbons, for increasing the ionic oxygen content of the gas, and so reducing atmospheric pollution and the greenhouse effect. Moreover, the carbon atoms liberated from the oxygen are also ionized and therefore freely dispersed in the atmosphere.

The FIGS. 1–6 device may also be fitted, upstream from silencer 7 or in any other suitable position, inside the exhaust conduit 6 of spark-ignition combustion engines without a catalyzed muffler and therefore run on leaded petrol.

Exhaust gas tests conducted over tens of thousands of kilometers on car spark-ignition combustion engines with a carburetor, no catalyzed muffler, and run on leaded petrol, gave the results shown below, which are also purely indicative and subject to improvement:

1) without the purifying device:
carbon monoxide CO 0.55%
carbon dioxide $CO_2$ 15.00%
unburnt hydrocarbons HC 188 ppm
nitrous oxide NO 156 ppm
oxygen $O_2$ 0.76%
2) with the purifying device:
carbon monoxide CO 0.30%
carbon dioxide $CO_2$ 6.00%
unburnt hydrocarbons HC 96 ppm
nitrous oxide NO 69 ppm
oxygen $O_2$ 12.12%

On spark-ignition combustion engines without a catalyzed muffler, the device therefore not only reduces the carbon dioxide and unburnt hydrocarbon content, substantially as in the previous case, but also reduces the content of harmful carbon monoxide and nitrous oxide to achieve the same advantages as with a catalyzed muffler which cannot be employed on such engines.

In the FIGS. 7–11 embodiment, number 105 indicates a diesel engine run, therefore, on gas oil, and the exhaust gas of which, especially when operated cold, contains unburnt hydrocarbon waste in particulate form; the exhaust conduit 106 is divided into two portions 111 and 112 to enable insertion of the ionization cell 114 housed inside casing 113; and casing 113 presents a substantially oval section with a plane of symmetry 40 through the longer axis of the section.

More specifically, casing 113 comprises a lateral wall 41 and two substantially flat outer transverse walls 42 and 43, and houses another two inner transverse walls 44 and 46 substantially parallel to walls 42 and 43; walls 43 and 46 define a first gas flow inverting chamber 47; walls 42 and 44 define a second gas flow inverting chamber 48; and cell 114 comprises a central tube 49 extending in gastight manner through two openings 51 and 52 (FIG. 9) in respective walls 44 and 46.

Casing 113 also presents two fittings 53 and 54 extending inwards of casing 113 and offset axially in relation to each other; fitting 53 is fitted in gastight manner through an opening formed in wall 42 and offset in relation to the axis of casing 113, and is connected to portion 111 of conduit 106 (FIG. 7); and fitting 54 is coaxial with and connected in gastight manner to tube 49, is fitted in gastight manner through an opening formed in outer wall 43, and is connected to portion 112 of conduit 106.

Between inner walls 44 and 46, casing 113 also houses a further two substantially identical tubes 56 and 57 fitted in gastight manner inside respective openings in walls 44 and 46; tube 56 is connected in gastight manner to fitting 53; tube 57 connects the two inverting chambers 47 and 48; and the respective axes of tubes 56 and 57 (FIG. 10) lie in a plane parallel to plane of symmetry 40.

At wall 46, each tube 56, 57 presents a portion 58 extending by a given length inside chamber 47 and housing a cylindrical metal mesh filter 59. Each metal mesh filter 59 is fitted inside with a respective preheating element comprising an electric resistor 61 or similar, which is supplied by battery 109 and presents a respective appendix 60 projecting towards chamber 47 for connection to battery 109. Resistors 61 provide for further burning the particulate in the exhaust gas before this is fed through ionization cell 114.

Cell 114 comprises two pairs 62 and 63 of cathodes 64 aligned along the axis of central tube 49; and each cathode 64 comprises a brush or peripherally pointed disk, the tips 66 of which (FIG. 11) provide for hurling bands of negative ions substantially radially on to a corresponding portion of tube 49 acting as an anode. Tips 66 may be offset axially to generate intersecting bands of negative ions extending along a given portion of the axis of cathode 64.

The cathodes 64 in each pair 62, 63 are connected by a respective axial bar 67 in turn connected to an electric terminal 68, which is inserted inside a column 69 made of insulating material and fitted in gastight manner through an opening 70 in tube 49; the two openings 70 are appropriately spaced axially on tube 49; each column 69 is fitted removably to lateral wall 41 of casing 113 by means of a spacer 71 and a plate 72; and each terminal 68 is connected electrically to electronic circuit 116 (FIG. 7).

The exhaust gas from engine 105 (FIGS. 7, 8 and 9) flows into fitting 53 of casing 113, along tube 56 and through respective filter 59 into first inverting chamber 47, and through respective filter 59 into tube 57. The two filters 59 are maintained at a high temperature by the exhaust gas, and are preheated by respective resistors 61, so that the unburnt hydrocarbons flowing through filters 59 continue burning to reduce the particulate content of the exhaust gas.

At the outlet of tube 57, the exhaust gas flows through second inverting chamber 48 into central tube 49 and along the ionization portions defined by the two pairs 62 and 63 of cathodes 64; the high-speed negative ions emitted by cathodes 64 on to the respective portions of central tube 49 break the peripheral electron bonds of the complex molecules of the toxic or pollutant components in the exhaust gas, so as to liberate nonpollutant ionic molecules; and, from tube 49, the exhaust gas flows along fitting 54 into portion 112 of conduit 106 and through silencer 107 into the atmosphere. In FIGS. 8 and 9, the labyrinthine path of the exhaust gas is shown by the respective arrows.

The advantages of the exhaust gas purifying device according to the present invention will be clear from the foregoing description. In addition to the gas being purified anyway of a large quantity of toxic or pollutant components before issuing from the exhaust pipe, the device also tends to reduce the carbon dioxide content, thus liberating ionic oxygen and ionic carbon to reduce the greenhouse effect.

In the case of leaded petrol engines, the device also reduces the carbon monoxide and nitrous oxide content, thus performing the same function as a catalyzed muffler; and, on diesel engines, the device reduces the particulate content, i.e. the unburnt substances in the exhaust gas from the cylinders.

As is known, the percentage of toxic and pollutant components in exhaust gas varies considerably depending on the speed and temperature of the engine. More specifically, when cold-starting the engine or accelerating sharply, the mixture is rich in fuel, which may not be burnt completely; and, when engine speed is reduced rapidly, a greater vacuum is produced at the intake stroke, thus reducing the pressure of the exhaust gas. In each of these cases, components with a higher specific weight than air, such as water vapour and moisture-saturated hydrocarbon vapours, are encountered, and which form a dense layer of gas, which increases atmospheric pollution and may alter the dielectric air layer of the ionization cell.

Figure 12:
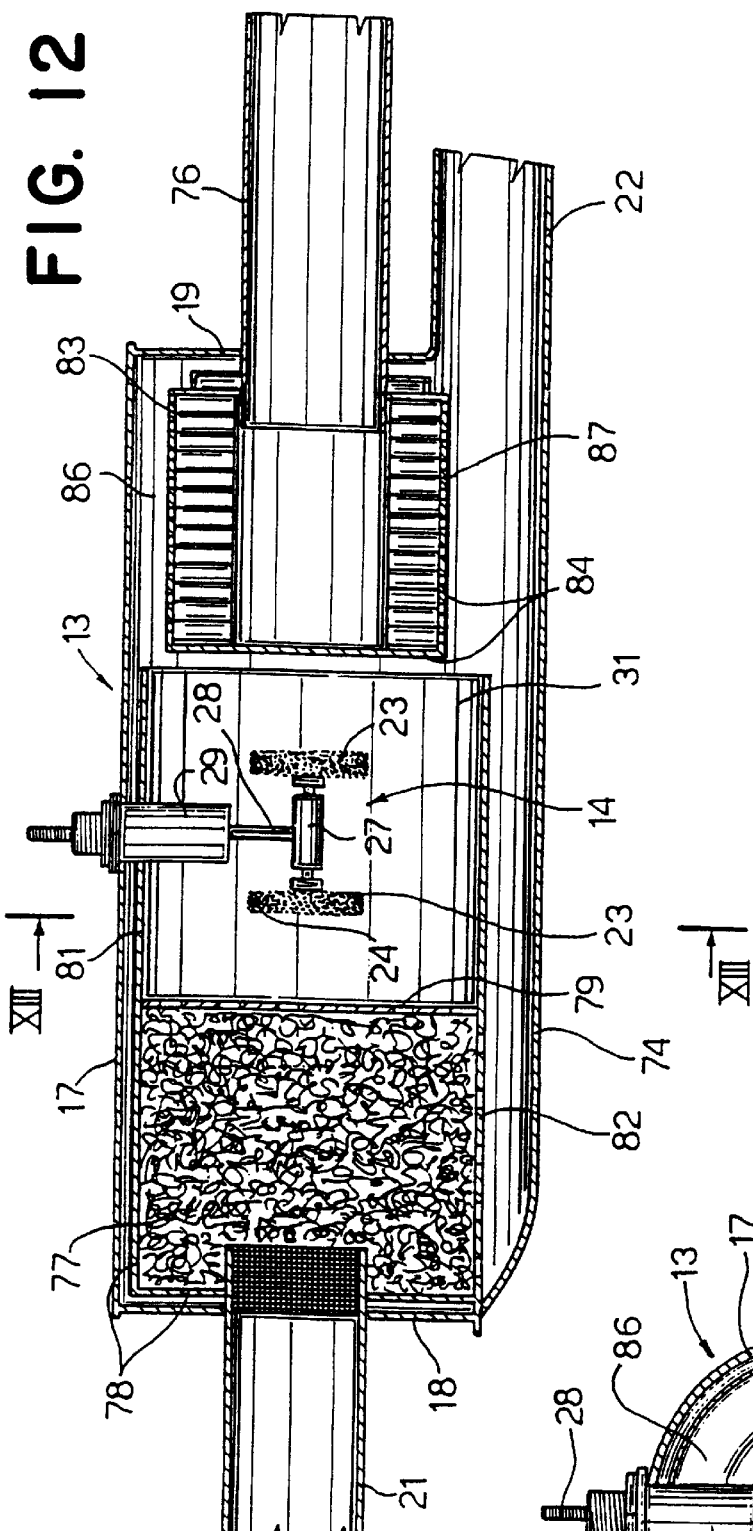
FIG. 12 shows a section, similar to that in FIG. 3, of a variation of the device.
Figure 13:
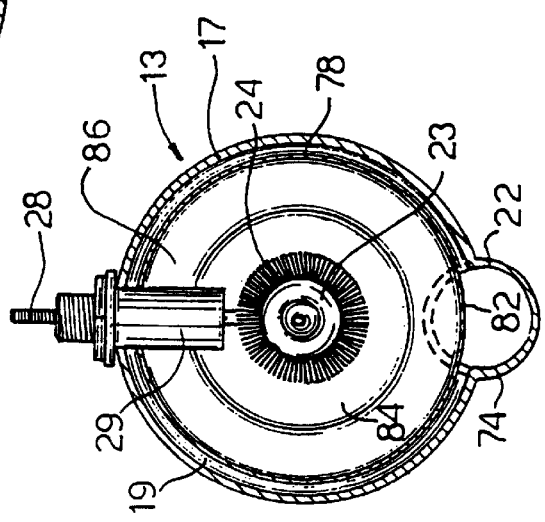
FIG. 13 shows a section along line XIII—XIII in FIG. 12.

In the variation of the device shown in FIGS. 12 and 13, the above vapours are reduced and separated from the exhaust gas, and at least part of the reoxygenated, ionized exhaust gas is fed back into the usual intake conduit 73 (FIG. 1) of engine 5, where it is mixed with fresh fuel and air to form a plasma by which to optimize fuel combustion. For which purpose, casing 13 presents, at the bottom, a semicircular-section projection 74 coaxial with fitting 22 of wall 19; and fitting 22 is therefore located at the bottom of casing 13, and is connected to silencer 7 by portion 12 of conduit 6, as in FIG. 3.

Wall 19 also presents a third fitting 76 connected to intake conduit 73 (FIG. 1) by a conduit not shown, and which (FIG. 12) is coaxial with inlet fitting 21 and with cathodes 23. The inner end of fitting 21 is inserted inside a filter 77 for maintaining a high temperature of the exhaust gas, and which comprises masses of material for also dehydrating the water and fuel vapours. More specifically, said masses comprise spheroidal pellets of expanded clay and/or zeolite and/or foamed aluminium and/or other inorganic thermal insulating material housed inside a cylindrical metal container 78 and retained by a flat perforated sheet metal wall 79. Container 78 is coaxial with casing 13, and the lateral wall of container 78 comprises a portion 81 forming the anode for the two cathodes 23 and forming the lateral wall of expansion chamber 31. The lateral wall of container 78 also presents a portion 82 located at projection 74, and which is also perforated to allow the particulate and saturated vapour molecules to drop into projection 74. Being spheroidal, the pellets of filter 77 are easily stirred by the intermittent inflow of gas from engine 5 to achieve a rapid exchange of kinetic energy with the gas flowing through; and the physical and chemical characteristics of the material of filter 77 provide for dehydrating the vapours in the exhaust gas.

Recirculating fitting 76 is inserted inside a further, e.g. metal sponge, filter 83, and is housed coaxially inside a cylindrical sheet metal container 84 in turn housed inside a further chamber 86 of casing 13 and presenting a lateral wall 87 perforated over its entire cylindrical surface.

At a steady operating speed of engine 5, i.e. with a correct stoichiometric air-fuel supply ratio, the exhaust gas flows along fitting 21 and is filtered by filter 77; any particulate particles fall through perforated portion 82 into projection 74 and are fed into output fitting 22; and the filtered gas flows through wall 79 into expansion chamber 31, where it is purified and ionized as in FIG. 3, and then into chamber 86.

During operation of the engine, by virtue of the vacuum in intake conduit 73, part of the gas comprising the lighter gases such as hydrogen and oxygen flows from chamber 86 through filter 83 and along fitting 76 back into intake conduit 73 of engine 5; while the rest of the gas from filter 77 and chamber 31, containing the heavier molecules such as unburnt polymers, flows along output fitting 22 to silencer 7, taking with it any particulate that has fallen into projection 74.

When cold-starting engine 5 using the starter to enrich the fuel mixture, and when accelerating sharply, in which case the mixture is enriched by operation of the accelerator, the exhaust gas entering fitting 21 contains vapours saturated with water and fuel, and which, as they flow through filter 77, are converted into dry vapours and fed into chamber 31. Any leftover vapour is condensed and falls in the form of drops into projection 74 and outlet fitting 22.

The dry fuel molecules, on the other hand, flow through filter 83 and along fitting 76 back into intake conduit 73, thus greatly reducing atmospheric pollution —especially in town traffic, at traffic lights or in traffic jams—while at the same time improving engine efficiency and reducing fuel consumption.

Clearly, changes may be made to the embodiments of the device described and illustrated herein without, however, departing from the scope of the present invention. For example, the FIGS. 7–11 embodiment may also be provided with a recirculating fitting as in FIGS. 12 and 13; and changes may be made to the section of casing 13, 113 and/or to the shape or number of cathodes 23, 64.

More specifically, cathodes 64 may comprise pointed disk-shaped electrodes, and may also be used in the FIGS. 1–6 and FIGS. 12–13 embodiments; the brush cathodes 23 may also be used in the FIGS. 7–11 embodiment; and, in all the embodiments, changes may be made to the path of the gas and the arrangement of filters 33, 38, 59.

In the FIGS. 12–13 embodiment, recirculating fitting 76 may be positioned radially; and, in the FIGS. 1–6 and 12–13 embodiments, a heating element may be provided to reduce the quantity of unburnt substances in the exhaust gas. Whichever the case, the metal sponge filter 33 in FIGS. 2 and 3 and resistors 61 (FIG. 9) need not necessarily be operative.

We claim:

1. A device for purifying the exhaust gas of an internal combustion engine comprising a voltage source (9, 109) and an exhaust conduit (6, 106) for collecting and externally discharging said gas; said exhaust conduit (6, 106) being connected with a casing (13, 113) housing an ionization cell (14, 114) for generating a discharge of electrons such as to form an ionization portion along the path of said gas; an electronic circuit (16, 116) supplied by said source (9, 109) to produce said discharge in such a manner that said electrons assume such a speed as to break the peripheral electron bonds of the molecules of said gas, thus liberating nonpollutant ionic molecules; said cell (14, 114) housing circularly symmetric electrode means (23, 64; 26, 49); characterized in that said electrode means include at least one pair of coaxial circularly symmetric cathodes (23, 64), each one having a number of metal wires (24, 66) provided on the peripheral edge of each said cathode (23, 64) as to form a circular brush, said wires (24, 64) hurling said electrons substantially radially toward an anode (26, 49) coaxially located around said cathodes (23, 64), the cathodes (23, 64) of said pair being connected to each other by a bar (27, 67) of predetermined length, said bar (27, 67) being connected by insulating means (29, 69) to an electric terminal (28, 68) fitted to said casing (13, 113).

2. A device as claimed in claim 1 characterized in that said casing (13, 113) is formed of at least a lateral wall (17, 41) and two transverse walls (18, 19; 42, 43); said transverse walls (18, 19; 42, 43) presenting respective fittings (21, 22; 53, 54) connected between two portions (11, 12; 111, 112) of said exhaust conduit (6, 106), for ensuring a smooth path for said gas with no sharp variation in section.

3. A device as claimed in claim 1, characterized in that said insulating means comprise a column (29, 69) made of insulating material and fitted through with said electric terminal (28, 68); a portion of said electrode (28, 68) located outside said casing (13, 113) being connected electrically to said electronic circuit (16, 116).

4. A device as claimed in claim 1, characterized in that said cell (14, 114) is housed in said exhausted conduit (6, 106) upstream from a silencer (7, 107) for said exhaust gas.

5. A device as claimed in claim 4, for a spark-ignition combustion engine (5) with a catalyzed muffler (8); characterized in that said cell (14, 114) is housed in said exhausted conduit (6) between said catalyzed muffler (8) and said silencer (7).

6. A device as claimed in claim 1, characterized in that said cell (14) presents means (33, 38, 77, 83) for maintaining a high temperature of the gas flowing through said cell (14).

7. A device as claimed in claim 6, characterized in that said maintaining means (33, 38, 77, 83) comprise a metal sponge filter (33, 38, 83).

8. A device as claimed in claim 7, characterized in that said fittings (21, 22) are coaxial with each other, and each comprise an edge (26) forming the anode of a respective cathode (23) in said pair.

9. A device as claim in claim 8, characterized in that said fittings (21, 22) each present a given portion (32) extending inside said casing (13); each said portion (32) being surrounded by a said filter (33) and terminating with a said edge (26).

10. A device as claimed in claim 9, characterized in that said edges (26) are spaced axially to define an expansion chamber (31) for said gas, and for preventing the formation of counterpressures on said gas in the direction of the engine (5).

11. A device as claimed in claim 10, characterized in that said expansion chamber (31) is covered externally by an additional metal sponge filter (38).

12. A device as claimed in claim 10, characterized in that said casing (13) presents a substantially cylindrical section; said filter. (33) comprising, for each of said portions (32), two semiannular portions (34), each comprising a metal sponge (36) enclosed in a semiannular container (37) presenting at least one perforated sheet metal wall; said containers (37) being fitted to said casing (13).

13. A device as claimed in claim 2, characterized in that said casing (13) presents a third fitting (76) connected to an intake conduit (73) of the engine (5) to feed at least part of the purified, ionized gas back to said intake conduit (73).

14. A device as claimed in claim 4, characterized in that the outlet fitting (22) of said casing (13) is located at a bottom portion of said casing (13), and provides for exhausting part of the gas rich in any one of vapours and particulate.

15. A device as claimed in claim 6, characterized in that said maintaining means (77, 83) comprise a filter (77) comprising masses of material for converting moist vapours into dry vapours.

16. A device as claimed in claim 15, characterized in that said masses are in the form of spheroidal pellets for enabling a rapid exchange of energy with the gas flowing through intermittently.

17. A device as claimed in claim 16, characterized in that said material comprise any one of expanded clay and zeolite and foamed aluminium and other inorganic insulating material.

18. A device as claimed in claim 15, characterized in that said spheroidal pellet filter (77) is housed in a sheet metal container (78) presenting a perforated portion (82) at said outlet fitting (22); said container (78) also presenting a perforated wall (79) adjacent to a gas expansion chamber (31) housing said pair of cathodes (23).

19. A device as claimed in claim 18, characterized in that said container (78) presents a cylindrical lateral wall coaxial with said cathodes (23); a portion (81) of said lateral wall defining said expansion chamber (31) and acting as an anode; and said third fitting (76) and the inlet fitting (21) for the gas being coaxial with said cathodes (23).

20. A device as claimed in claim 19, characterized in that, between said third fitting (76) and said expansion chamber (31), there is provided a further metal mesh filter (83) housed in a further cylindrical container (84) presenting a perforated lateral wall.

21. A device as claimed in claim 4, for a diesel engine (105); characterized in that said cell (114) is associated with at least one preheating element (61) to assist the combustion of unburnt components of said exhaust gas.

22. A device as claimed in claim 21, characterized in that said preheating element (61) is located upstream from said cell (114), and comprises a metal mesh (59) preheated by an electric resistor (61) supplied by said voltage source (109).

23. A device as claimed in claim 22, characterized in that said casing (113) houses two inner transverse walls (46, 44) respectively forming a first inverting chamber (47) and a second inverting chamber (48) for inverting the flow of said gas.

24. A device as claimed in claim 23, characterized in that one (54) of said fittings (53, 54) is coaxial with a central tube (49) forming said anode; said tube (49) being located between said inner transverse walls (44, 46); and each of said fittings (53, 54) extending inside said casing (113) up to a respective inner transverse wall (44, 46).

25. A device as claimed in claim 24, characterized in that, between said inner transverse walls (44, 46), there are provided a further two tubes (56, 57) for the passage of said gas between said two inverting chambers (47, 48); one (56) of said further tubes (56, 57) being connected to the other (53) of said fittings (53, 54).

26. A device as claimed in claim 25, characterized in that each of said two further tubes (56, 57) comprises a portion (58) housing said metal mesh (59) and said preheating element (61).

27. A device as claimed in claim 26, characterized in that said portions (58) extend by a given length inside said first inverting chamber (47); said preheating element (61) comprising an appendix (60) projecting towards said first inverting chamber (47).

28. A device as claimed in claim 21, characterized in that said casing (113) presents an oval section and a plane of symmetry (40) through the longer axis of said section; said further tubes (56, 57) being located with their respective axes in a plane parallel to said plane of symmetry (40).

29. A device as claimed in claim 21, characterized in that said central tube (49) houses two pairs (62, 63) of cathodes (64); said pairs (62, 63) being housed inside two axially-spaced seats (70) in said central tube (49); and each said pair being fitted removably to a lateral wall (41) of said casing (113).

* * * * *